(12) United States Patent
Mühlemann

(10) Patent No.: US 11,242,187 B2
(45) Date of Patent: Feb. 8, 2022

(54) EXTRACTION CAPSULE

(71) Applicant: MÜHLEMANN IP GMBH, Stein am Rhein (CH)

(72) Inventor: Rolf Mühlemann, Schlattingen (CH)

(73) Assignee: Mühlemann IP GmbH, Stein am Rhein (CH)

( * ) Notice: Subject to any disclaimer, the term of this patent is extended or adjusted under 35 U.S.C. 154(b) by 321 days.

(21) Appl. No.: 16/087,226

(22) PCT Filed: Mar. 20, 2017

(86) PCT No.: PCT/EP2017/056572
§ 371 (c)(1),
(2) Date: Sep. 21, 2018

(87) PCT Pub. No.: WO2017/162595
PCT Pub. Date: Sep. 28, 2017

(65) Prior Publication Data
US 2019/0047771 A1    Feb. 14, 2019

(30) Foreign Application Priority Data
Mar. 22, 2016   (EP) .................................... 16161748

(51) Int. Cl.
    *B65D 81/32*       (2006.01)
    *B65D 85/804*      (2006.01)
    *A47J 31/06*        (2006.01)

(52) U.S. Cl.
    CPC ..... *B65D 81/3216* (2013.01); *B65D 85/8043* (2013.01); *A47J 31/0668* (2013.01)

(58) Field of Classification Search
None
See application file for complete search history.

(56) References Cited

U.S. PATENT DOCUMENTS 3,802,056 A * 4/1974 Jaeger .................... B21D 51/26
                                                                           29/422
4,056,050 A * 11/1977 Brown ................ A47J 31/0573
                                                                           99/305

(Continued)

FOREIGN PATENT DOCUMENTS

EP           2210826 A1    7/2010
WO     2011/159162 A1    12/2011

(Continued)

OTHER PUBLICATIONS

International Search Report dated Apr. 27, 2017 for PCT/EP2017/056572 filed Mar. 20, 2017.

(Continued)

*Primary Examiner* — Ibrahime A Abraham
*Assistant Examiner* — Gyounghyun Bae
(74) *Attorney, Agent, or Firm* — Paul D. Bianco; Gary S. Winer; Fleit Intellectual Property Law

(57) ABSTRACT

An extraction capsule which contains a substance for preparing a liquid food, includes an extraction-side base with an outlet opening and a lateral wall which adjoins the base and has a terminal flange that is aligned radially outwards, and an injection-side filling opening which is closed by a sealing film. The extraction-side base has a peripheral edge region and a circumferential joint point which adjoins a base that lies in a first position on a plane prior to being used. The base can be brought from the first position into a second position which lies closer to the film sealing the filling opening. The extraction capsule has a console which is molded on the lateral wall and directly and/or indirectly on which an extraction-side sealing film to be perforated lies, with a perforator passing through the sealing film in the second position.

17 Claims, 6 Drawing Sheets

(56) References Cited

U.S. PATENT DOCUMENTS

| | | | | | |
|---|---|---|---|---|---|
| 4,158,329 | A | * | 6/1979 | McKnight | A47J 31/02 426/433 |
| 4,256,030 | A | * | 3/1981 | de Bruin | A47J 31/0642 99/295 |
| 4,627,986 | A | * | 12/1986 | Bardsley | B65D 81/32 206/217 |
| 9,580,235 | B2 | * | 2/2017 | Rondelli | B65D 85/8043 |
| 10,000,335 | B2 | * | 6/2018 | Bisio | B65D 85/8043 |
| 2003/0161912 | A1 | * | 8/2003 | Zeng | A47G 19/2205 426/87 |
| 2008/0264267 | A1 | * | 10/2008 | Doglioni Majer | B65D 85/8043 99/295 |
| 2009/0007793 | A1 | * | 1/2009 | Glucksman | B65D 85/8043 99/287 |
| 2009/0223375 | A1 | * | 9/2009 | Verbeek | B67D 1/0045 99/287 |
| 2010/0203198 | A1 | * | 8/2010 | Yoakim | A23F 5/262 426/80 |
| 2011/0183043 | A1 | * | 7/2011 | Reati | B65D 85/8043 426/82 |
| 2011/0244099 | A1 | * | 10/2011 | Perentes | A47J 31/3695 426/431 |
| 2014/0123859 | A1 | * | 5/2014 | Verbeek | A47J 31/407 99/295 |
| 2014/0130678 | A1 | * | 5/2014 | Frydman | A47J 31/407 99/295 |
| 2015/0175347 | A1 | * | 6/2015 | Empl | A47J 31/369 426/433 |
| 2015/0183576 | A1 | * | 7/2015 | Vanni | B65D 85/8043 426/115 |
| 2015/0336736 | A1 | * | 11/2015 | Cabilli | B65D 85/8043 426/112 |
| 2016/0068334 | A1 | * | 3/2016 | Cafaro | B65D 77/08 426/115 |
| 2016/0113435 | A1 | * | 4/2016 | Cabilli | A47J 31/407 426/115 |
| 2016/0157668 | A1 | * | 6/2016 | Bugnano | B67D 1/0888 426/87 |
| 2016/0166105 | A1 | * | 6/2016 | Bugnano | A47J 31/4492 426/232 |
| 2016/0362246 | A1 | * | 12/2016 | Garcin | A47J 31/407 |
| 2017/0355585 | A1 | * | 12/2017 | Van De Sluis | B67D 1/0078 |

FOREIGN PATENT DOCUMENTS

| WO | 2013/167789 A2 | 11/2013 |
|---|---|---|
| WO | 2014/033341 A1 | 3/2014 |
| WO | 2014/061045 A1 | 4/2014 |

OTHER PUBLICATIONS

Written Opinion for PCT/EP2017/056572 filed Mar. 20, 2017.
International Search Report and Written Opinion dated Sep. 25, 2018 for PCT/EP2017/056572 filed Mar. 20, 2017.

* cited by examiner

EXTRACTION CAPSULE

FIELD OF THE INVENTION

The present invention relates to an extraction capsule, which contains a substance for preparing a liquid food, comprising an extraction-side bottom with an outlet opening and a lateral wall that adjoins the bottom and has a terminal flange aligned radially outward, and comprising an injection-side filling opening, which is closed by a sealing film.

BACKGROUND OF THE INVENTION

Such extraction capsules are preferably used for making coffee or tea, but also soups, and currently available on the market in large numbers.

Such capsules are placed in corresponding preparation machines, specifically in a way that the injection-side filling opening closed with a sealing film is penetrated by one or more injection elements, and an internal pressure builds up in the extraction capsule. For this purpose, the extraction capsule is placed in a so-called brewing chamber in the beverage preparation machine, and held positively and non-positively in this brewing chamber during the extraction process. In the most popular version of such capsules, the extraction-side bottom incorporates means that keep the substance present in the extraction capsule from washing out, and a sealing film is applied in the direction of flow, which is destroyed by the buildup of internal pressure, so that the liquid enriched with the substances processed in the outlet opening present in the extraction-side bottom can flow outward. For example, such a solution is known from WO 2014/033341.

In an alternative solution, the sealing film that closes the capsule space on the extraction side is replaced by a rupture disk. However, the function remains absolutely identical in this alternative embodiment. Of course, the correspondingly arising problem is the same in both systems.

Specifically, this problem lies in the fact that the pressure to be built up depends on the quality of the injection-side film on the one hand, and on the absolutely uniform quality of the sealing film to be destroyed under pressure or the seams of a bursting plate to be burst on the other. The result is often that the corresponding bursting film or bursting plate does not open to the extent desired, so that the quality of the extraction beverages can vary greatly. If the pump of the beverage preparation machine is timed, a smaller volume is then obtained for a coffee beverage, but it has a significantly more intense flavor than for a beverage in which the bursting film or bursting plate opened completely and correctly, for example. If the pump of the beverage preparation machine is volume controlled, the quantity of beverage will be the same, but the significantly longer extraction time will make the taste of the prepared beverage more intense in this case as well, in particular when coffee or tea is here involved.

Finally known from WO 2014/061045 is an extraction capsule. In this known solution, the bottom plate is comprised of a central area and an annular area surrounding the latter, whose thickness is equal to the thickness of the central area and the thickness of the wall area. The annular area is connected with the central area of the bottom plate by a first circular film hinge, while the outer circumference of the annular area is connected with the capsule wall by a second concentric film hinge. However, this solution only allows for a very limited travel path, in which the required movement in a peripheral direction can only be absorbed by the film hinges, but the latter will not hold up when overstretched.

SUMMARY OF THE INVENTION

Therefore, the object of the present invention is to offer an extraction capsule in which opening the sealing film, which is part of the extraction capsule or an insertion capsule accommodated therein, no longer depends on the pressure built up in the extraction capsule, so that the sealing film applied on the extraction side is opened significantly more safely and uniformly, and a larger travel path is enabled for the perforation means by comparison to known solutions.

Another object of the present invention is to offer an extraction capsule which can be configured with or without an insertion capsule that can be placed therein.

Another object of the present invention is to offer an extraction capsule that can be injected out of plastic as a single piece, and above and spaced apart from the extraction-side bottom is provided with a console, on which lies the extraction-side sealing film to be perforated.

If an insertion capsule is additionally accommodated in the extraction capsule, the danger of insufficient perforation is especially high, since the insertion capsule in the extraction capsule still allows for a certain residual movement in the extraction capsule. This results in the largest possible travel path for the perforation means of bottom plate of the extraction capsule.

These various objects are achieved by an extraction capsule as disclosed herein. The additional objects mentioned above along with other additional objects are also disclosed.

The solution according to the invention also makes it possible to accommodate an insertion capsule in the extraction capsule, and use the intermediate space between the extraction capsule and insertion capsule, wherein this space can be filled with a substance other than the substance in the insertion capsule, for example, and wherein liquid can further be injected into this space between the extraction capsule and insertion capsule via injection, flow around the insertion capsule and be mixed with the liquid flowing out of the capsule in the area above the extraction-side bottom. Such an extraction capsule with insertion capsule can also be regarded as a separate invention independent of the peroration means described above. For example, perforation means can be arranged in the preparation machine.

BRIEF DESCRIPTION OF THE DRAWINGS

In the following specification, various embodiment variants shown on the attached figures and claimed in the dependent claims are described in detail, and their mode of action and significance are described.

Shown on the attached drawings.

DETAILED DESCRIPTION OF THE INVENTION

Figure 1:
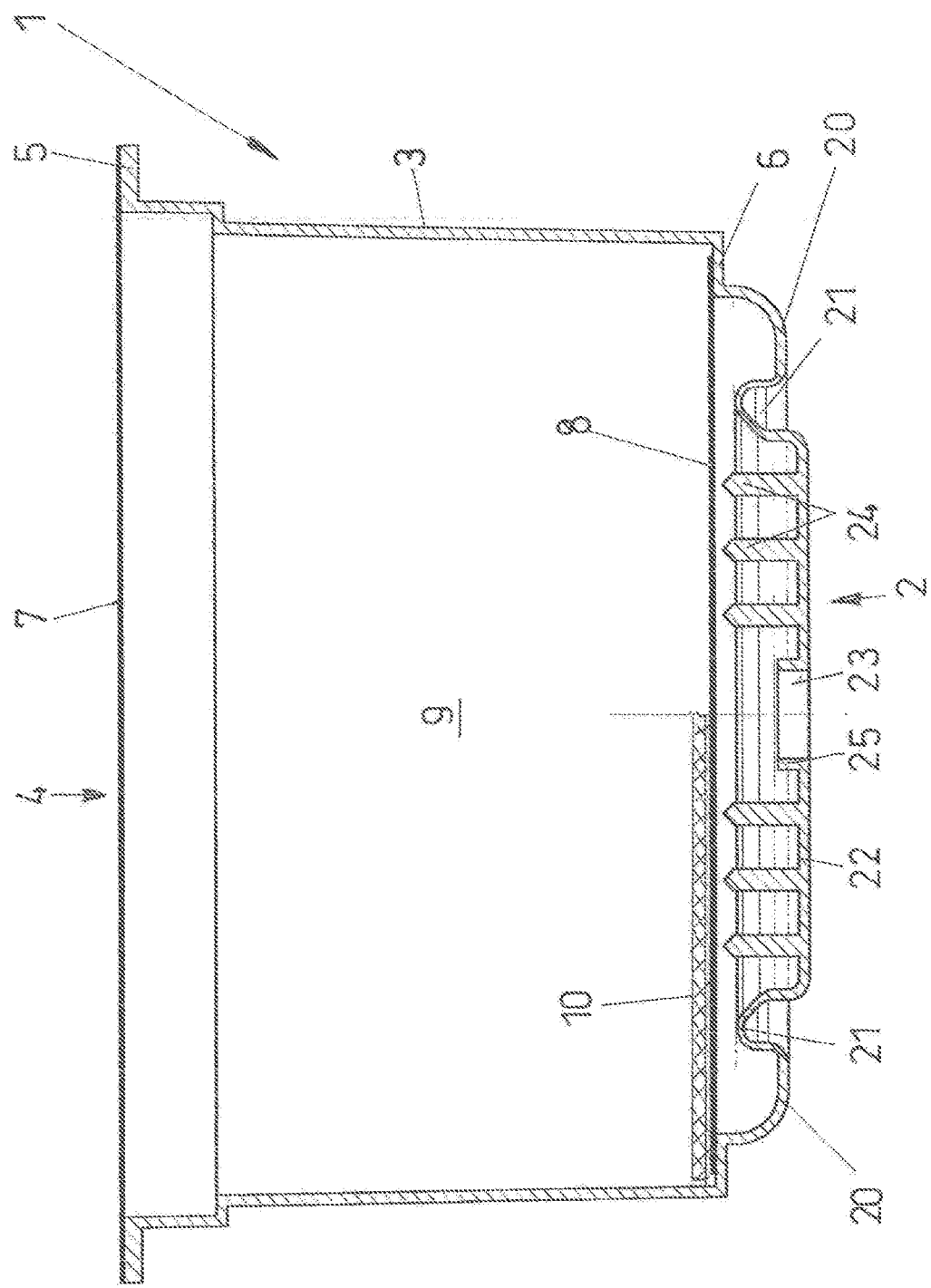
FIG. 1 is a diametric view through a first embodiment of the extraction capsule according to the invention, which except for the two sealing films to be applied can be completely integrally fabricated out of plastic through injection molding.

FIG. 1 shows an especially simple embodiment of the extraction capsule 1 according to the invention. Such an extraction capsule has an extraction-side bottom 2, on which follows the integrally molded on lateral wall 3, which is conical or quasi cylindrical in design, and ends in a flange 5 aligned peripherally outward. Since the extraction capsule is injection molded out of thermoplastic resin, the lateral wall 3 must always be configured to run conically outward at an inclination. This is a necessity to even be able to demold the capsule from the injection mold in the first place. Even though the lateral wall 3 appears cylindrical in the drawing, this opening angle is naturally realized, and the lateral wall was here correspondingly described as quasi cylindrical above. While the opening angle in the injection mold can naturally be as desired, a minimum opening angle most often lies below a 1% deviating inclination from the vertical.

The extraction capsule 1 thus has its largest internal diameter in the area of the filling opening 4. In the filled state of the extraction capsule, this filling opening 4 is provided with a sealing film 7. This sealing film 7 seals the filling opening 4, and is welded onto the flange 5. Molded onto the bottom-side end of the lateral wall 3 is a console 6. The latter runs parallel to the flange 5. A sealing film 8 is welded onto this console 6, and closes the useful space 9 of the extraction capsule 1 on the extraction side. The extraction-side bottom 2 has two different areas, specifically an outer, peripheral edge area 20, which is stationary, and a central area with an adjustable position that comprises a bottom plate 22. A circumferential hinge area 21 runs between these two areas. The hinge area is designed as an annular and U-shaped channel with a thinned wall in relation to the bottom plate 22 and edge area 20. The adjustable-position bottom plate 22 is in a first position prior to use. In this first position, the bottom plate 22 lies in a plane that is located farther away from the plane in which the sealing film 7 lies on the filling opening 4. In this first position shown on FIG. 1, the bottom plate 22 also lies in a deeper position than the peripheral, stationary edge area 20. In the second position (not shown), the bottom plate 22 of the extraction-side bottom 2 lies in the same plane in which the peripheral, stationary edge area 20 lies.

Configuring the circumferential hinge area 21 as a U-shaped channel with a thinner wall than the bottom plate 22 and stationary edge area 20 allows a flexible folding movement by the hinge area 21. This embodiment yields a large travel path, without significant forces hereby arising in the area of the hinge area 21, which would lead to the destruction of the hinge area.

The extraction capsule 1 according to the invention is intended to be accommodated in an extraction chamber of a preparation machine. The height of this receiving chamber corresponds to the distance between the circumferential flange 5 of the extraction capsule and the stationary, peripheral edge area 20 of the extraction-side bottom 2. If the extraction capsule 1 is now placed in the receiving chamber of the preparation machine, it initially protrudes over its edge. When this extraction chamber is closed, the bottom plate 2 lying on the bottom of the extraction chamber is now displaced around the hinge area 21 in the direction of the filling opening 4 until the bottom plate 2 runs in the same plane as the stationary, peripheral edge area 20. During this change in position, the perforation means 24 molded onto the bottom plate 22 now penetrate through the extraction-side sealing film 8, which is welded onto the console 6 to close the useful space 9 of the extraction capsule 1. The sealing film 7 closes the filling opening 4, and injection needles of the preparation machine now penetrate through this sealing film 7, injecting an extraction medium into the useful space 9. This extraction medium flowing into the useful space 9 under pressure flows through the useful space 9 and the useful medium located therein. As already mentioned, this useful medium can be coffee or tea, but of course can also be some other completely soluble powdery or viscous product, which then gets into the area above the bottom plate 22, and from there via the outlet opening 23 to the outside into a collecting cup or plate. If the useful medium is an insoluble or only partially soluble product, for example coffee or tea, known means must be present to retain these products in the useful space 9 of the extraction capsule 1. FIG. 1 depicts such a known means in the left half of the extraction capsule. This means is here a screen mat 10. Of course, this screen mat must also extend over the entire extraction-side sealing film 8. A screen plate can also be provided instead of a screen mat 10.

In this preferred embodiment according to FIG. 1, the entire extraction capsule 1 including the perforation means 24 is integral in design. Only the screen mat 10 and sealing films 7 and 8 are applied later on.

Figure 2:
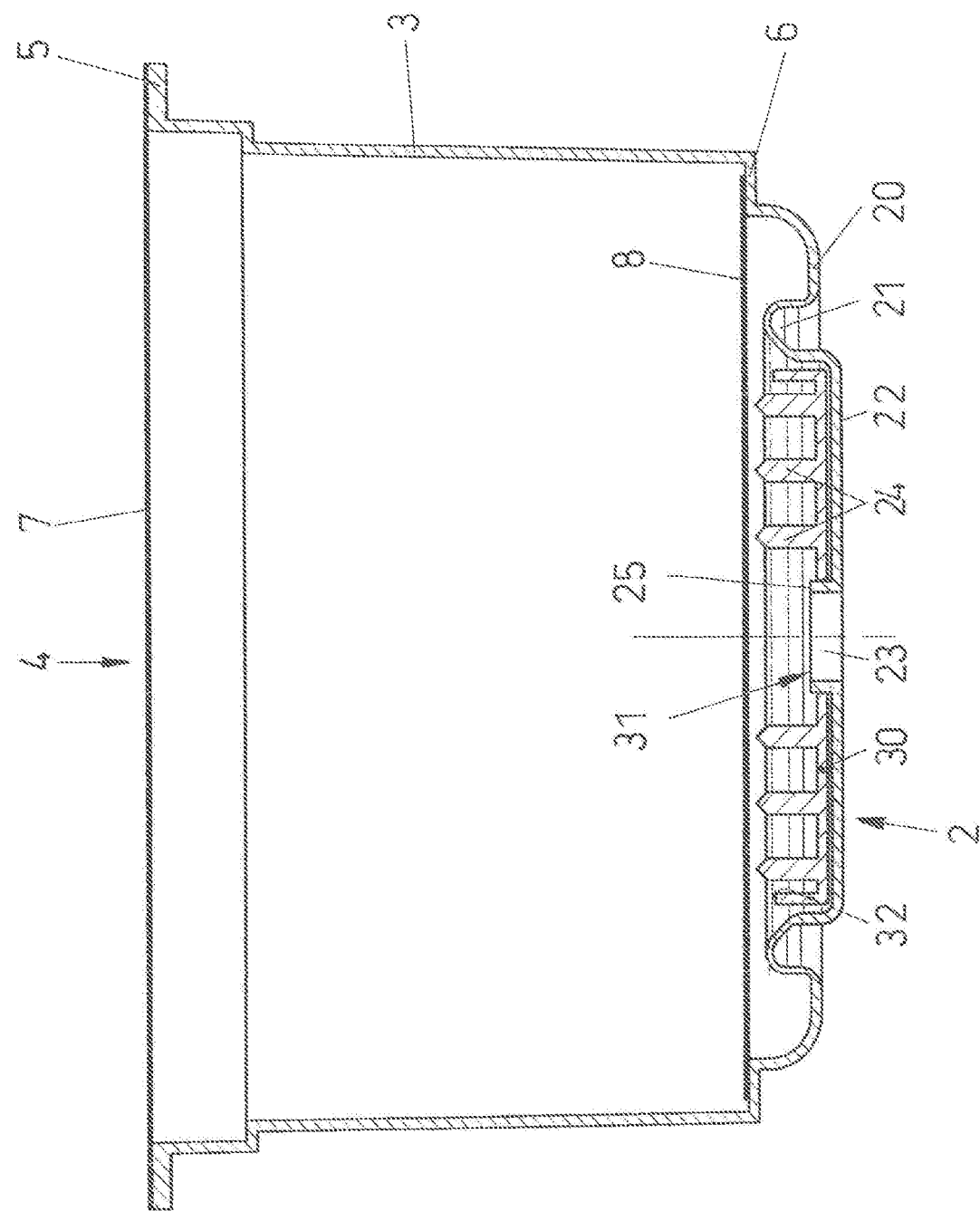
FIG. 2 is an embodiment in which the extraction cup can be equipped with a barrier layer, wherein a perforation plate lies on the extraction-side bottom.

The solution illustrated on FIG. 2 only differs from this preferred solution according to FIG. 1 in that the perforation means are not molded directly onto the bottom plate 22, with a perforation plate 30 here instead being placed on the bottom plate, and the perforation means 24 are secured to this perforation plate 30. The perforation plate 30 has a central passage 31 that stays on an inwardly protruding edge 25 of the outlet opening 23.

Of course, the function is here once again the same as described based on FIG. 1. However, the perforation plate 30 here additionally has a peripheral stop edge 32 in the outermost area of the perforation plate. If the bottom plate 22 is in the second position described above, this peripheral stop wall 22 rigidly abuts the extraction-side sealing film 8. This ensures that the extraction medium flowing out through the perforation openings will not get into the area of the stationary, peripheral edge area 20 that practically forms a circumferential channel, but will only flow out through the central passage 31 in the perforation plate 30 and onto the bottom plate 22, and from there get to the outside through the outlet opening 23.

The two previously described embodiments according to FIGS. 1 and 2 proceed from solutions in which the extraction capsule 1 has a useful space 9, which can be directly filled with a useful medium. However, it can indeed make sense to introduce the useful medium into this useful space 9 not directly, but rather indirectly by means of an insertion capsule 40. This insertion capsule 40 is placed into the extraction capsule through the filling-side opening 4. The insertion capsule 40 has an injection-side bottom 41, which in the completely placed state is flush with the plane that defines the circumferential flange 5 of the extraction capsule 1. As a result, the sealing film 7 that closes the filling opening 4 can be used to fix the insertion capsule 40 in the correspondingly correct position. Accordingly, the sealing film 7 will not only be welded onto the flange 5, but at least also in the edge area of the injection-side bottom 41.

In the version described here, radially aligned support ribs 50 are now molded onto the lateral wall 3 and console 6, and extend downwardly up to the stationary, peripheral edge area 20. In these radially aligned support ribs 50, a respective step 51 is molded into each rib at the height of the console 6.

These molded-in steps 51 run at the same height as the upper edge of the console 6. The insertion capsule 40 now rests on these molded-in steps 51. The part of the support ribs 50 that extends from the console 6 downward into the peripheral edge area 20 forms the stiffening part 52 of these support ribs 50. At the same time, flow-through openings 53 whose importance will be addressed below form between the support ribs 50 and lateral wall 3 on the one hand, and between the support rib and stationary, peripheral edge area 20 on the other. The function of the extraction capsule 1 according to the invention relative to the perforation effect is to this extent the same, since the bottom plate 22 is hereby moved from a first starting position into a second end position, and the perforation means here 24 penetrate through a sealing film on the extraction side. However, the difference lies in the fact that a separate extraction-side sealing film on the console 6 is here not penetrated, with a sealing film 44 that closes the extraction-side filling opening 44 of the insertion capsule 40 rather being penetrated instead.

Figure 3:
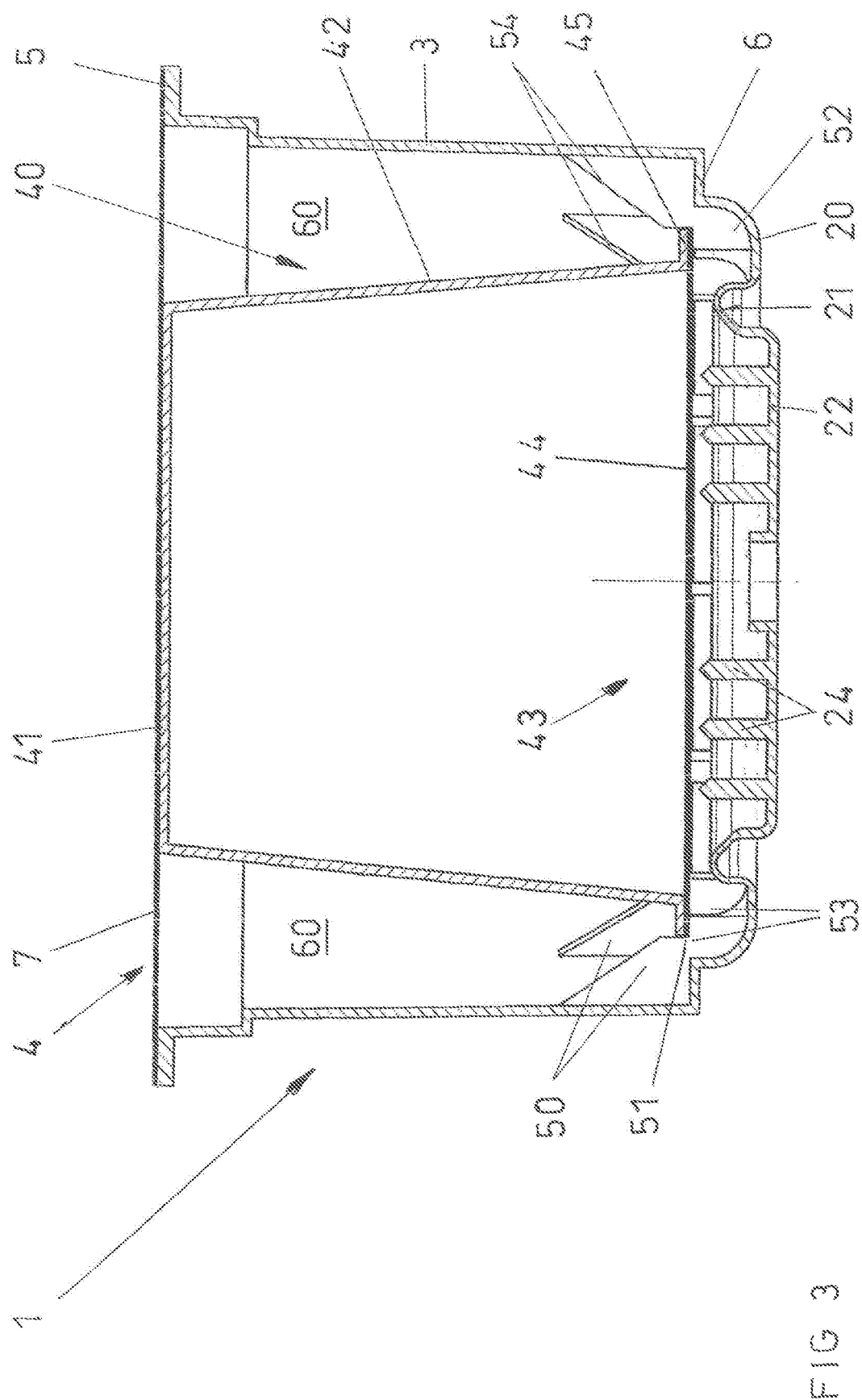
FIG. 3 is a solution corresponding to FIG. 1 with a differently configured console and an insertion capsule lying on the console.
Figure 4:
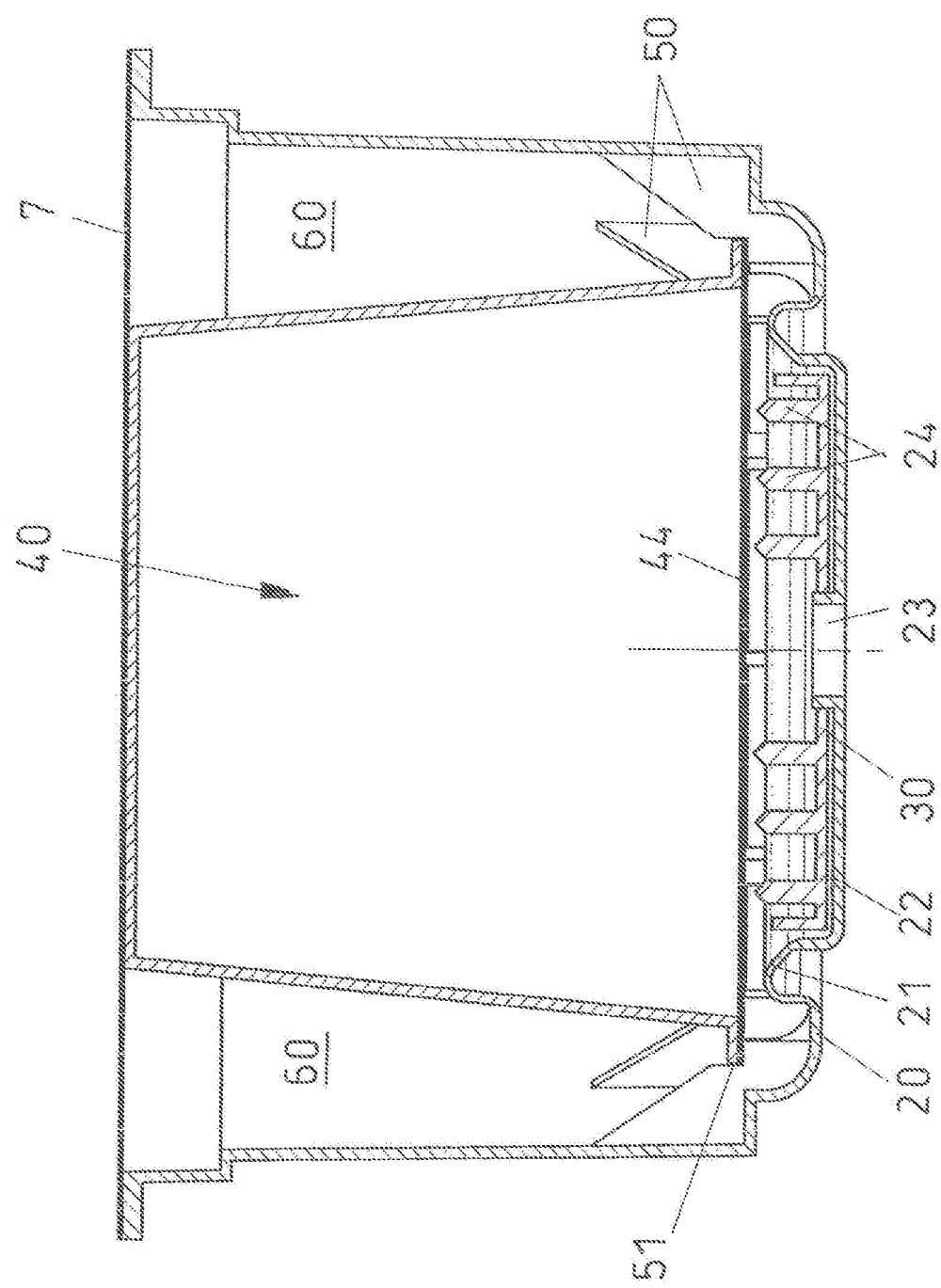
FIG. 4 is a solution similar to FIG. 3, except that a separate perforation plate lies on the extraction-side bottom as with the variant according to FIG. 2.

The version according to FIG. 4 also corresponds fully to the solution according to FIG. 3, except that the perforation means 24 are here not directly cast onto the bottom plate as in the variant according to FIG. 2, with a perforation plate 30 here being arranged on the bottom plate 22 instead. Otherwise, reference is made to the description with regard to FIG. 2.

A circumferential, annular trough 60 remains between the insertion capsule 40 and extraction capsule 1, specifically between their two lateral walls 3 and 42. This annular trough 60 can be filled with another useful medium, and flushed out with a liquid phase here referred to as a mixing medium by means of additional injection needles of the preparation machine, which in turn penetrate through the sealing film 7. The useful media in the insertion capsule 40 and in the annular trough 60 can here practically supplement each other. Since both the insertion capsule 40 and the extraction capsule 1 can be fabricated integrally and provided with a barrier layer in the embodiment according to FIG. 4, the two useful media will not influence each other even over a prolonged storage time, and are both completely hermetically sealed in storage. Let it here further be noted that the outlet opening 23 in this case can best be closed with a bursting film or a tear-off sealing film.

FIGS. 5 and 6 again show two variants of the extraction capsule 1 according to the invention, which both contain an insertion capsule 40. In these two embodiments, the insertion capsule 40 has a wider flange 46. This widened flange 46 makes it possible to provide extraction passages 47 in the flange itself. In addition, an extraction-side sealing film is here welded onto the console 6, as described previously for the embodiments according to FIGS. 1 and 2. The insertion capsule 40 also has a sealing film 44 that closes the extraction-side filling opening 43, but this sealing film 44 does not extend over the extraction passages 47 in the expanded flange 46. The extraction passages 47 are thus only closed by the extraction-side sealing film 8 on the console 6. In this case, the building pressure in the annular trough 60 will already be enough to destroy this film in the area of the extraction passage 47. This not least because the extraction-side sealing film 8 of which use is here made can be significantly thinner as a second film than the sealing film 44 of the very much larger surface of the extraction-side filling opening 43 of the insertion capsule 40, which this film 44 must close.

The perforation plate 30 present here once again differs from the extraction plate described above in that it lies on shortened radial ribs 55, wherein these shortened radial ribs serve as reinforcements for the stationary, peripheral edge area 20. Since the perforation plate 30 now no longer lies directly on the bottom plate 22, support means 28 are now molded onto the underside of the perforation plate 30, and here arranged practically flush under the perforation means 24. This solution also makes it possible to arrange peripheral spikes 34 on the peripheral edge of the perforation plate 30, which are aligned to the extraction passages 47. However, this then requires that corresponding orientation means be provided on the interior side of the lateral wall 3 and on the outer area of the expanded flange 46, which precisely align the insertion capsule 40 in the extraction capsule 1, which must also hold true with regard to the perforation plate 30 in this case. Since this solution involves a correspondingly high assembly outlay, preference is given to the solution that instead has a thinned extraction-side sealing film 8 on the console 6. The simple embodiment is shown on the left side of FIG. 5, the embodiment with spikes 34 on the right side.

Figure 5:
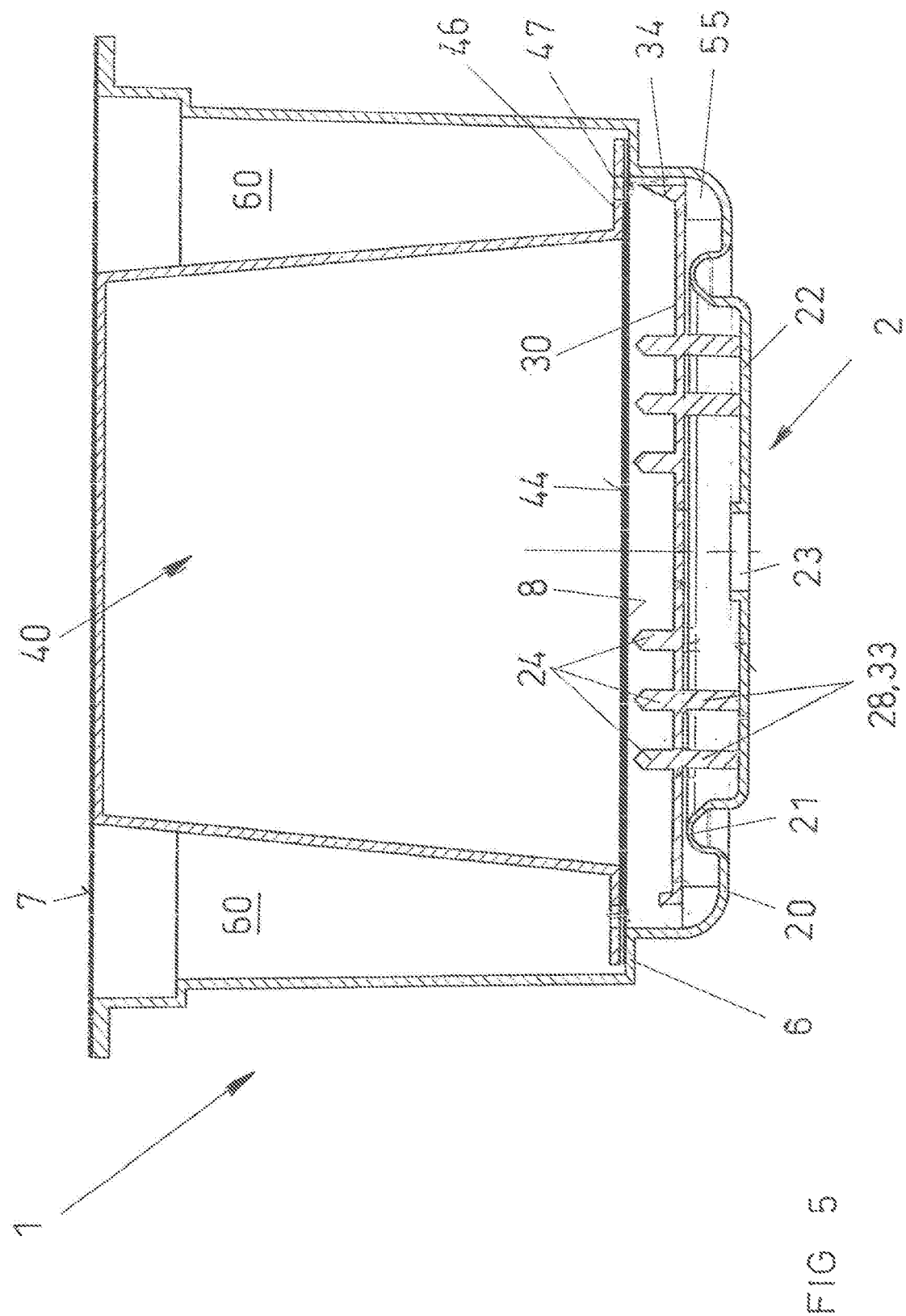
FIG. 5 is another extraction cup with a console as depicted on FIG. 1 and FIG. 2, on which an insertion capsule with expanded flange now lies, and a perforation plate that is supported on the extraction-side bottom.
Figure 6:
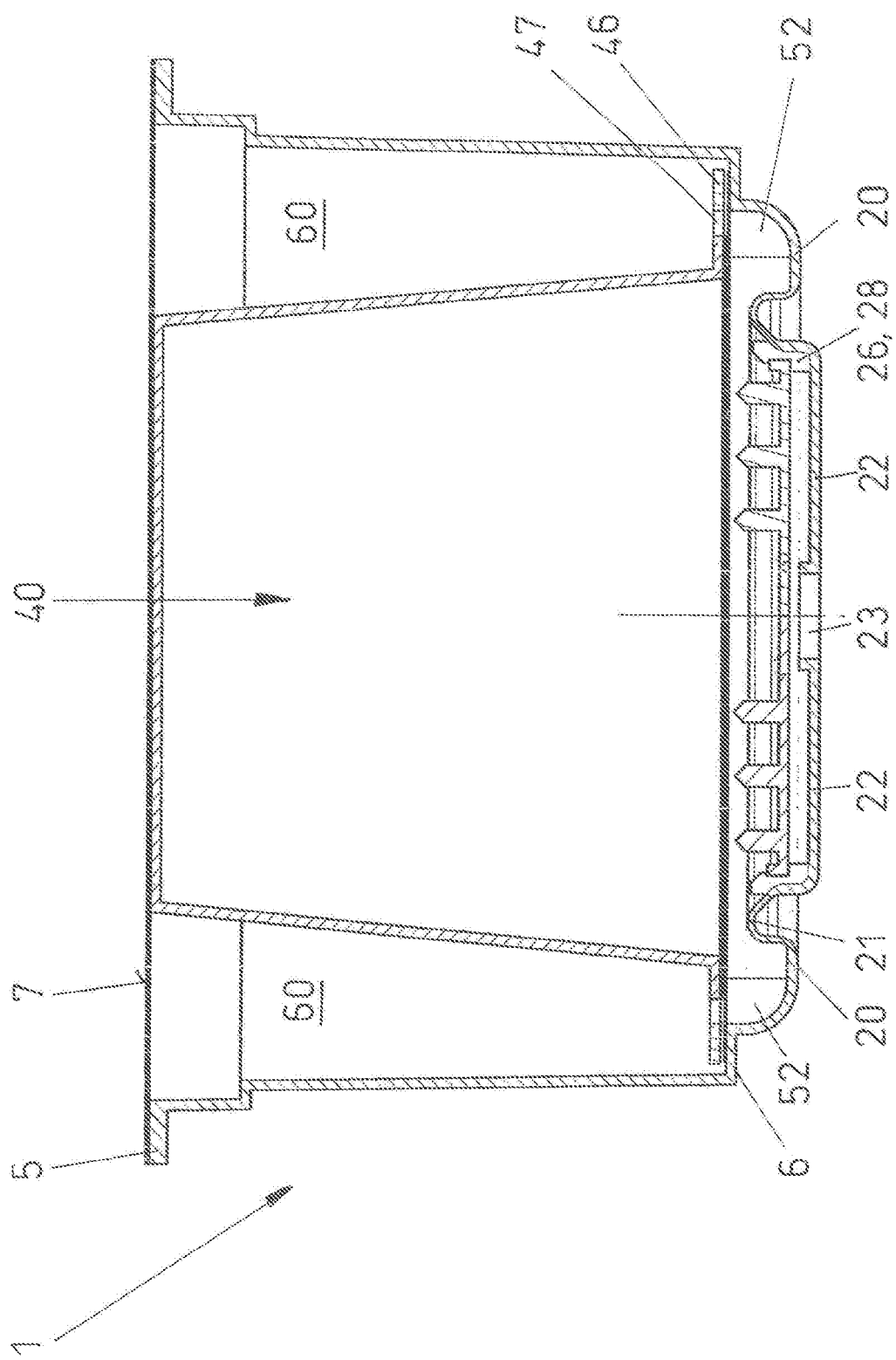
FIG. 6 is a corresponding alternative, wherein means hold the perforation plate on the extraction-side bottom separately, but irreversibly positively.

FIG. 6 now illustrates one last embodiment that differs from the embodiment according to FIG. 5 only in that the perforation plate 30 is here not connected with the bottom plate 22 via support means 28, instead of which several retaining means 26 distributed around the circumference are molded onto the bottom plate 22, which in the area of the surrounding hinge area 21 rest laterally against the latter, but are not connected with them, so as not to stiffen the hinge area. The retaining means 26 have a locking lug 27, which holds the perforation plate 30 reversibly or irreversibly, depending on the shape and size. The ribbed retaining means 26, which are arranged radially aligned in the periphery of the bottom plate 22, leave enough of an intermediate space between the hinge area 21 and perforation plate 30 for a mixing medium injected into the annular trough 60 to be able to get into the intermediate space between the bottom plate 22 and perforation plate 30 via the hinge area 21. This makes it possible to virtually completely separately supply the mixing medium through the trough 60 on the one hand, and the extraction medium through the insertion capsule 40 on the other either practically separately to the outlet opening 23 in the bottom if a central outlet 35 is also molded into the perforation plate 30. However, if a central outlet 35 is not present in the perforation plate 30, the extraction medium is of necessity forced out of the insertion capsule 40, also through the annular gap defined by the retaining means 26, so that the two media are ideally mixed in this area.

Despite the variety of different possible embodiments of the subject matter of the invention, all solutions are based on the fact that a relative mobility of the bottom plate 22 due to the annular hinge area 21 allows it to move from a first position, in which the bottom plate 22 lies below the stationary, peripheral edge area 20, into a second position at the same height as the stationary, peripheral edge area 20. This solution is here completely independent of a pressure built up in the useful space 9 of the extraction capsule 1 or a pressure built up inside of an insertion capsule 40 and the associated pressure-induced deformation of the extraction-side sealing film applied to the console 6, and of the deformation of the sealing film 44 of the insertion capsule 40 applied to the filling opening 43 on the extraction side. Perforation takes place solely owing to the necessarily present spatial conditions in an extraction chamber of a preparation machine, wherein the bottom plate 22 is here displaced purely mechanically by the forces applied while closing the brewing chamber.

However, the present invention also makes it possible to use significantly simpler preparation machines, because the bottom plate can also be displaced just at the press of a user's thumb. As a consequence, the sealing film 44 or sealing film 8 or both sealing films, which can be present on the extraction side, can get into the machine already in the perforated state. As a result, a lower injection pressure is required, and the corresponding closing means of the brewing chamber can also be given a simplified design.

As already mentioned above, the extraction capsule with insertion capsule inserted can also be claimed independently of the perforation means integrated into the extraction capsule as a separate invention. For example, perforation means can be present in the corresponding preparation machine.

REFERENCE LIST

1 Extraction capsule
2 Extraction-side bottom
3 Lateral wall
4 Filling opening
5 Flange
6 Console
7 Sealing film that closes filling opening
8 Extraction-side sealing film on console
9 Useful space of extraction capsule
10 Screen mat or screen plate
20 Stationary, peripheral edge area
21 Circumferential hinge area
22 Bottom plate
23 Outlet opening
24 Perforation means
25 Inwardly protruding edge of outlet opening
26 Retaining means for perforation plate 30
27 Locking lug
28 Support means
30 Perforation plate
31 Central passage in perforation plate
32 Peripheral stop edge
33 Support post
34 Peripheral spikes
40 Insertion capsule
41 Injection-side bottom
42 Lateral wall of insertion capsule
43 Extraction-side filling opening
44 Sealing film of extraction-side filling opening
45 Extraction-side flange
46 Expanded flange
47 Extraction passages
50 Support ribs, radially aligned
51 Molded step
52 Stiffening part of support ribs
53 Flow-through openings
54 Central area of support ribs
55 Shortened radial ribs
60 Annular trough

The invention claimed is:

1. An extraction capsule, which contains a substance for preparing a liquid food, comprising:
a body forming a peripheral wall having opposed ends defining an upper end and a lower end and lateral wall extending between the upper end and the lower end;
an inlet cover attached to the upper end of the peripheral wall, the inlet cover defining a filling opening sealed by an inlet film;
an outlet cover attached to the lower end of the peripheral wall and including a stationary peripheral edge area affixed to the lateral wall, and a circumferential hinge area forming a flexible U-shape of material that circumferentially attaches to the peripheral edge area on an outer side and circumferentially attaches to a bottom plate on an inner side, the hinge area enabling movement of the bottom plate from a first position to a second position, the second position closer to the upper end than the first position, the U-shape having a greater flexibility than the bottom plate and a greater flexibility than the peripheral edge area, the U-shape flexing to change shape and width when the bottom plate is moved from the first position to the second position to thereby reduce a radial force imparted to the bottom plate and to the peripheral edge area;
an outlet sealing film positioned adjacent and above the outlet bottom in a direction of the upper end to thereby form an enclosed chamber, together with the lateral wall and inlet sealing film, which contains the substance to be prepared;
a perforator attached to the bottom plate, and pointing towards the outlet sealing film in a direction of the upper end;
wherein when the bottom plate is moved from the first position to the second position the outlet sealing film is penetrated by the perforator to enable the prepared liquid food to be discharged.

2. The capsule according to claim 1, wherein the bottom-side end of the lateral wall has a molded circumferential console, onto which the extraction-side bottom is molded, wherein the circumferential console defines a plane which in the first position of the bottom plate lies completely above the perforator.

3. The extraction capsule according to claim 2, wherein an insertion capsule is held in the extraction capsule, and has a terminal flange to which a sealing film is applied that closes an injection-side filling opening of the insertion capsule on the extraction side, and wherein the insertion capsule lies on the circumferential console of the extraction capsule, and the insertion capsule is held in position by the sealing film of the extraction capsule, which is also connected with the injection-side bottom of the insertion capsule.

4. The extraction capsule according to claim 3, wherein the sealing film that closes the insertion capsule on the extraction side lies directly on the circumferential console.

5. The extraction capsule according to claim 3, wherein a fillable, annular trough remains between the lateral walls of the extraction capsule and the insertion capsule.

6. The extraction capsule according to claim 3, wherein passages are formed in the flange of the insertion capsule, which are closed by the sealing film on the extraction-side flange.

7. The extraction capsule according to claim 2, wherein a step is molded in each of the stiffening ribs at the same height, wherein the steps together define a circumferential console on which lies a centered insertion capsule.

8. The extraction capsule according to claim 7, wherein the steps in the stiffening ribs of the extraction capsule lie radially closer to the outlet opening in the extraction-side bottom of the extraction capsule than the circumferential console at the end of the lateral wall, so that flow-through openings remain between the lateral wall of the extraction capsule and the ribs with the centered insertion capsule inserted.

9. The capsule according to claim 1, wherein the stationary, peripheral edge area is provided with radially aligned stiffening ribs.

10. The extraction capsule of claim 1, wherein the circumferential hinge has a thickness less than a thickness of the bottom plate and a thickness less than a thickness of the peripheral edge area.

11. The extraction capsule of claim 1, wherein there is only one circumferential hinge area.

12. The extraction capsule of claim 1, wherein the circumferential hinge is a living hinge.

13. An extraction capsule, comprising:
   a body defining an upper end and a lower end and forming:
      a bottom plate having an aperture, the bottom plate centrally positioned at the lower end of the body;
      a hinge peripherally surrounding and supporting the bottom plate whereby the bottom plate is movable from a lower position to an upper position;
      a lower ledge peripherally surrounding and supporting the hinge;
      the hinge forming a flexible U-shape of material having a greater flexibility than the lower ledge and a greater flexibility than the bottom plate, the U-shape flexing to change shape and width when the bottom plate is moved from the lower position to the upper position to thereby reduce a radial force imparted to the bottom plate and to the lower ledge;
      a lateral wall peripherally surrounding and supporting the lower ledge and extending upwards away from the lower ledge to the upper end of the body;
      an upper ledge peripherally surrounding the lateral wall at the upper end of the body and extending away from the lateral wall;
      an upper seal affixed to the ledge to close the interior of the body at the upper end;
      a lower seal affixed proximate the lower ledge to close the interior of the body at the lower end, thereby forming a closed chamber defined by the upper seal, the lateral wall, and the lower seal;
      one or more projections affixed to the bottom plate, the projections sized and positioned to pierce the lower seal when the bottom plate is hingedly moved from the lower position to the upper position;
      the upper seal pierceable to inject a liquid into the closed chamber to mix with a consumable substance when a consumable substance is placed within the chamber, the lower seal pierceable to admit passage of the mixed liquid and consumable substance through the aperture and out of the body.

14. The extraction capsule of claim 13, wherein the bottom plate, hinge, lateral wall and ledge are formed as a unitary piece.

15. The extraction capsule of claim 14, the one or more projections formed together with the bottom plate as a single piece.

16. The extraction capsule of claim 14, the one or more projections provided as a separate part attachable to the bottom plate.

17. The extraction capsule of claim 14, the hinge formed of thinner material than the bottom plate and lower ledge.

* * * * *